(12) United States Patent
Gaines et al.

(10) Patent No.: US 12,390,911 B2
(45) Date of Patent: Aug. 19, 2025

(54) UNIVERSAL JOINT TOOL ADAPTER ASSEMBLY

(71) Applicant: Snap-on Incorporated, Kenosha, WI (US)

(72) Inventors: Preston T. Gaines, Kenosha, WI (US); Craig Bashleben, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/096,570

(22) Filed: Nov. 12, 2020

(65) Prior Publication Data

US 2022/0143790 A1    May 12, 2022

(51) Int. Cl.
 B25B 23/00    (2006.01)

(52) U.S. Cl.
 CPC ...... B25B 23/0028 (2013.01); B25B 23/0035 (2013.01)

(58) Field of Classification Search
 CPC ............ B25B 23/0028; B25B 23/0035; B25B 23/0014
 USPC .............................. 81/177, 75; 464/136, 119
 See application file for complete search history.

(56) References Cited

U.S. PATENT DOCUMENTS

| | | | |
|---|---|---|---|
| 1,897,945 A * | 2/1933 | Dooley | F16D 3/40 81/177.75 |
| 1,926,858 A * | 9/1933 | Peters | F16D 3/40 464/132 |
| 1,978,590 A | 10/1934 | McNaught et al. | |
| 2,005,202 A | 6/1935 | Pilger | |
| 2,196,297 A | 4/1940 | Gagne | |
| 2,256,624 A | 9/1941 | Odlum | |
| 2,304,766 A | 12/1942 | Pratt | |
| 2,327,821 A | 8/1943 | Rueb | |
| 2,334,039 A | 11/1943 | Rueb | |
| 2,499,569 A * | 3/1950 | Cooley | B25B 13/06 403/57 |
| 2,636,759 A | 4/1953 | Rueb | |
| 2,704,005 A | 3/1955 | Clayson | |
| 2,796,619 A | 6/1957 | Hammer | |
| 3,045,454 A | 7/1962 | Rueb | |

(Continued)

FOREIGN PATENT DOCUMENTS

| | | |
|---|---|---|
| CN | 2483150 Y | 3/2002 |
| CN | 2634176 Y | 8/2004 |

(Continued)

OTHER PUBLICATIONS

United Kingdom Combined Search and Examination Report for corresponding UK Application No. GB2115333.3, dated Apr. 1, 2022, 7 pages.

(Continued)

Primary Examiner — Eric J Rosen
Assistant Examiner — Christopher Soto
(74) Attorney, Agent, or Firm — Taft Stettinius & Hollister LLP (57) ABSTRACT

A tool adapter assembly, such as, for example, a socket or socket adapter, having drive, center, and work bodies. The drive body and the work body can be adjusted in a number of positions/angles relative to one another by a user. The tool adapter assembly includes components adapted to retain a set/desired position/angle of the drive body and the work body relative to one another.

10 Claims, 8 Drawing Sheets

(56) References Cited

U.S. PATENT DOCUMENTS

| | | | |
|---|---|---|---|
| 3,585,885 A | | 6/1971 | Carr |
| 3,778,860 A | | 12/1973 | Thielen |
| 3,788,169 A | | 1/1974 | Nakayama |
| 3,850,533 A | | 11/1974 | Thielen |
| 4,135,372 A | | 1/1979 | Benson |
| 5,455,997 A | * | 10/1995 | Nasiell .................. B25B 13/481 29/888.011 |
| 5,458,028 A | * | 10/1995 | Cleveland, III .......... F16D 3/40 464/57 |
| 5,464,407 A | * | 11/1995 | McGuire ................ B25G 1/043 606/86 R |
| 5,485,769 A | * | 1/1996 | Olson ................ B25B 23/0035 81/177.85 |
| 6,017,010 A | * | 1/2000 | Cui .................... F16M 11/2078 403/56 |
| 6,383,081 B1 | | 5/2002 | DeBisschop |
| 6,656,053 B2 | * | 12/2003 | Chang ..................... F16C 11/00 464/119 |
| 6,862,958 B2 | | 3/2005 | Schade |
| 8,117,950 B2 | * | 2/2012 | Kozak ................ B25B 23/0014 81/177.75 |
| 9,776,310 B2 | * | 10/2017 | Chen .................. B25B 23/0035 |
| 2002/0151368 A1 | | 10/2002 | Chang |
| 2002/0157506 A1 | | 10/2002 | Schade |
| 2014/0069240 A1 | * | 3/2014 | Dauvin ............... B25B 23/0028 464/111 |
| 2015/0343614 A1 | | 12/2015 | Hassler |
| 2016/0053803 A1 | | 2/2016 | Yu |
| 2018/0209483 A1 | | 7/2018 | Yu |
| 2020/0256085 A1 | * | 8/2020 | Hiner .................... E04H 17/124 |

FOREIGN PATENT DOCUMENTS

| | | |
|---|---|---|
| CN | 101157215 A | 4/2008 |
| CN | 202451593 U | 9/2012 |
| CN | 102444674 B | 4/2014 |
| CN | 205036718 U | 2/2016 |
| GB | 756193 A | 8/1956 |
| GB | 2171492 A | 8/1986 |
| JP | H0796473 A | 4/1995 |
| JP | 07217665 | 8/1995 |
| JP | H07217665 A | 8/1995 |
| TW | 200639021 A | 11/2006 |
| TW | M431975 U | 6/2012 |
| TW | I481480 B | 4/2015 |
| TW | I700455 B | 8/2020 |
| WO | 2007142779 A2 | 12/2007 |

OTHER PUBLICATIONS

Australian Examination Report No. 1 for corresponding AU Application No. 2021254669, dated Nov. 4, 2022, 5 pages.
United Kingdom Office Action for corresponding UK Application No. GB2115333.3, dated Dec. 14, 2022, pages.
Chinese Office Action for corresponding Application No. 2021113350855 dated Apr. 14, 2023, 11 pages.
Canadian Office Action for corresponding Application No. 3,138,312 dated Jan. 6, 2023, 4 pages.
Taiwan Office Action for corresponding Application No. 110141299 dated Mar. 17, 2023, 15 pages.
Combined Search and Examination Report for corresponding Application No. GB2216660.7 dated May 2, 2023, 7 pages.
Australian Examination Report No. 2 for corresponding AU Application No. 2021254669, dated Sep. 14, 2023, 3 pages.
United Kingdom Office Action for corresponding UK Application No. GB2305969.4, dated Oct. 17, 2023, 6 pages.
Chinese Second Office Action for corresponding CN Application No. 202111335085.5, dated Nov. 22, 2023; 11 pages.
Chinese Patent Office, Decision of Rejection issued in corresponding Application No. 202111335085.5, dated Apr. 1, 24, 2024, 10 pp.
Taiwan Patent Office, Office Action issued in corresponding Application No. 113104236, dated Sep. 10, 2024, 11 pp.
Canadian Office Action for corresponding CA Application No. 3,138,312, dated Dec. 15, 2023, 4 pages.
United Kingdom Combined Search and Examination Report for corresponding UK Application No. GB2317172.1, dated Feb. 2, 2024; 6 pages.

* cited by examiner

UNIVERSAL JOINT TOOL ADAPTER ASSEMBLY

TECHNICAL FIELD

The present invention relates generally to tool adapters, such as adapters for socket adapters and sockets, and more particularly to adapters with universal joints.

BACKGROUND

Jointed tool adapters, such as, for example, socket adapters and sockets that utilize a universal joint, are used to engage and apply torque to work pieces, such as bolts, nuts, screws, etc. located in hard to reach places. These tool adapters allow transfer of torque from a torque application tool, such as, for example, a ratchet wrench, to a work piece at an angle with respect to a central axis of the work piece.

Jointed tool adapters can be different sizes or shapes to account for different sized or shaped work pieces. For example, a bolt having a hexagonal head that is ½" wide can be torqued with a ½" socket. Such a socket would typically include a ¼", ⅜", or ½" square female receptacle that would be matingly coupled with the torque application tool having a similar ¼", ⅜" or ½" square male drive lug. To access work pieces in hard to reach or angled places, a user typically maneuvers the jointed tool adapter to engage the work piece. However, conventional tool adapters that utilize universal joints have difficulty in maintaining a pre-set position/angle desired by the user. For example, conventional tool adapters easily move from a position/angle set by the user, thereby increasing the difficulty for the user to successfully maneuver the tool adapter to engage the work piece. In another example, spring-loaded tool adapters, which utilize torsion springs around the pivots to maintain the universal joint in a straight line at rest, are difficult to engage a work piece that is at an angle to the torque application tool.

SUMMARY

The present invention relates broadly to a tool adapter assembly. The tool adapter assembly includes a universal joint and tension and/or compression components to cause linear tension through the assembly, or cause compression forces against various components. This allows a position/angle to be set by the user, and the tool adapter assembly to retain the position/angle. In addition, the tension and/or compression components can be replaced, such that a stiffness of the assembly can be adjusted according to the user's preference or due to wear of the components.

In an embodiment, the present invention broadly comprises a tool adapter assembly. The assembly includes a center body, a drive body rotatably coupled to the center body and is adapted to engage a lug of a torque application tool, and a work body rotatably coupled to the center body and adapted to engage a work piece. A stiffening member is disposed within the center, drive, and work bodies and is adapted to resist movement of the drive body and the work body relative to one another from a set position, or retain the set position of the center, drive, and work bodies relative to one another.

In another embodiment, the present invention comprises a tool adapter assembly. The assembly includes a center body, a drive body, and a work body. The drive body rotatably is coupled to the center body and is adapted to engage a lug of torque application tool. The work body is rotatably coupled to the center body and is adapted to engage a work piece. The center body includes first and second apertures (such as for example, slots). An axial bore is disposed between the first and second apertures. The center body is rotatably coupled to the drive body with a first fastener (such as, for example, a pin). The center body is rotatably coupled to the work body with a second fastener (such as, for example, a pin). The first and second fasteners in the center body are forced against the center body with a biasing member, such as, for example, a spring, disposed in the axial bore. This provides rotational resistance between the center body and drive body, and center body and work body.

In another embodiment, the present invention broadly comprises a tool adapter assembly. The assembly including a center body including first and second apertures, and first and second rings respectively disposed in the first and second apertures. The rings may be made from a rubber or a similar material, although the invention is not limited as such. A drive body is rotatably coupled to the center body and is adapted to engage a lug of a torque application tool. A work body is rotatably coupled to the center body and is adapted to engage a work piece. The first and second rings to compress in an axial direction and/or expand in a radial direction when assembled due to a tight fit between the center and drive bodies and between the center and work bodies, or from a clamping force applied by threaded fasteners, although the invention is not limited as such. These rings allow the tool adapter assembly to resist movement of the drive body and the work body relative to one another from a set position, or retain the set position of the center, drive, and work bodies relative to one another.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a tool adapter assembly, such as a socket or socket adapter, which has a universal joint with an improved ability to maintain a desired swiveled/pivoted position/angle. This is accomplished by using a stiffening mechanism disposed within the assembly, applying a compressive force (such as, for example, a spring or springs) and/or friction force (such as, for example, rubber) to pins of the assembly together, or applying a compressive force (such, for example, as a spring or springs) and/or friction force (such as, for example, rubber) between a work body and center body and between a drive body and center body. The tension and/or compression components may be permanent, swappable, adjustable, and/or otherwise replaceable (such as in the event of wear).

Figure 1:
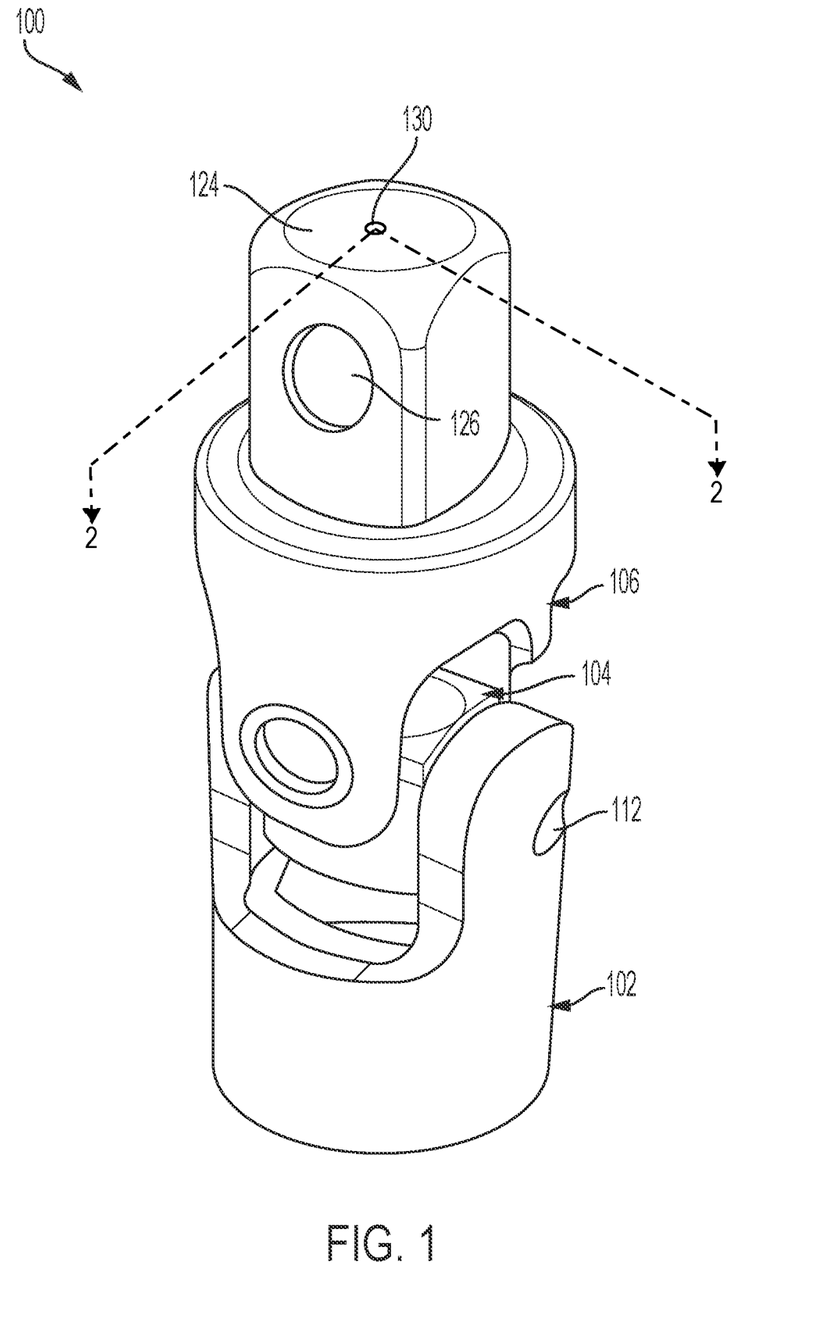
FIG. 1 is a perspective side view of a tool adapter assembly, according to an embodiment of the present invention.
Figure 2:
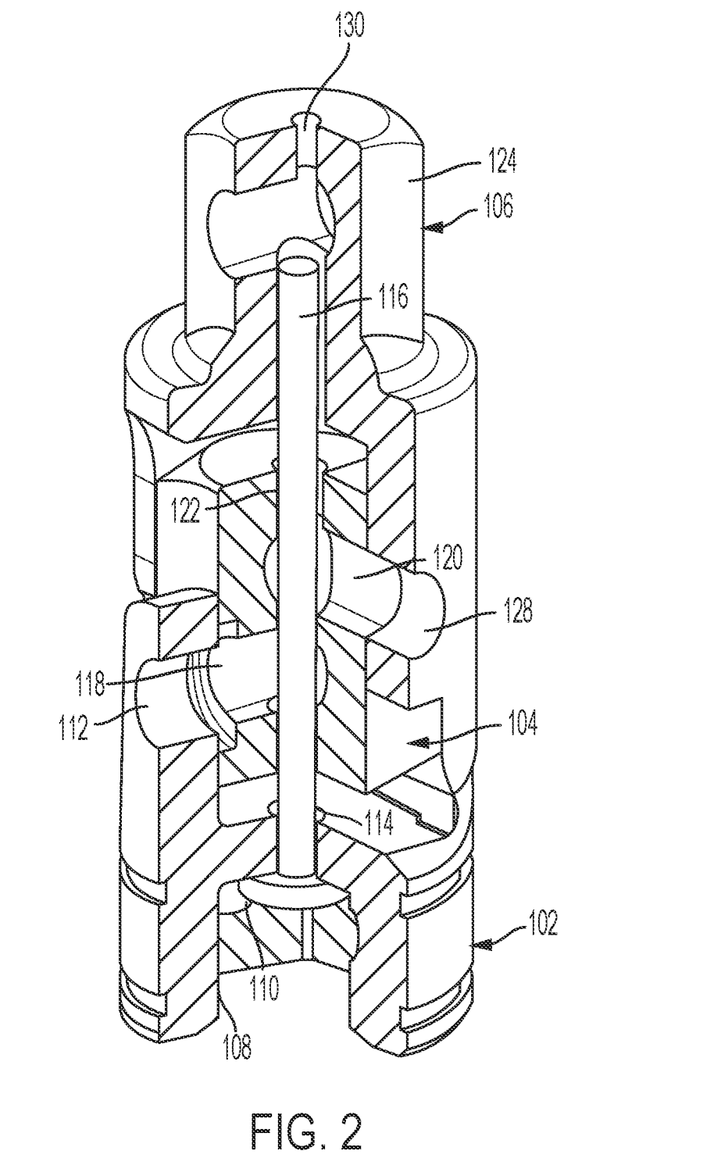
FIG. 2 is a sectional view of the tool adapter assembly of FIG. 1 taken along line 2-2 of FIG. 1.
Figure 3:
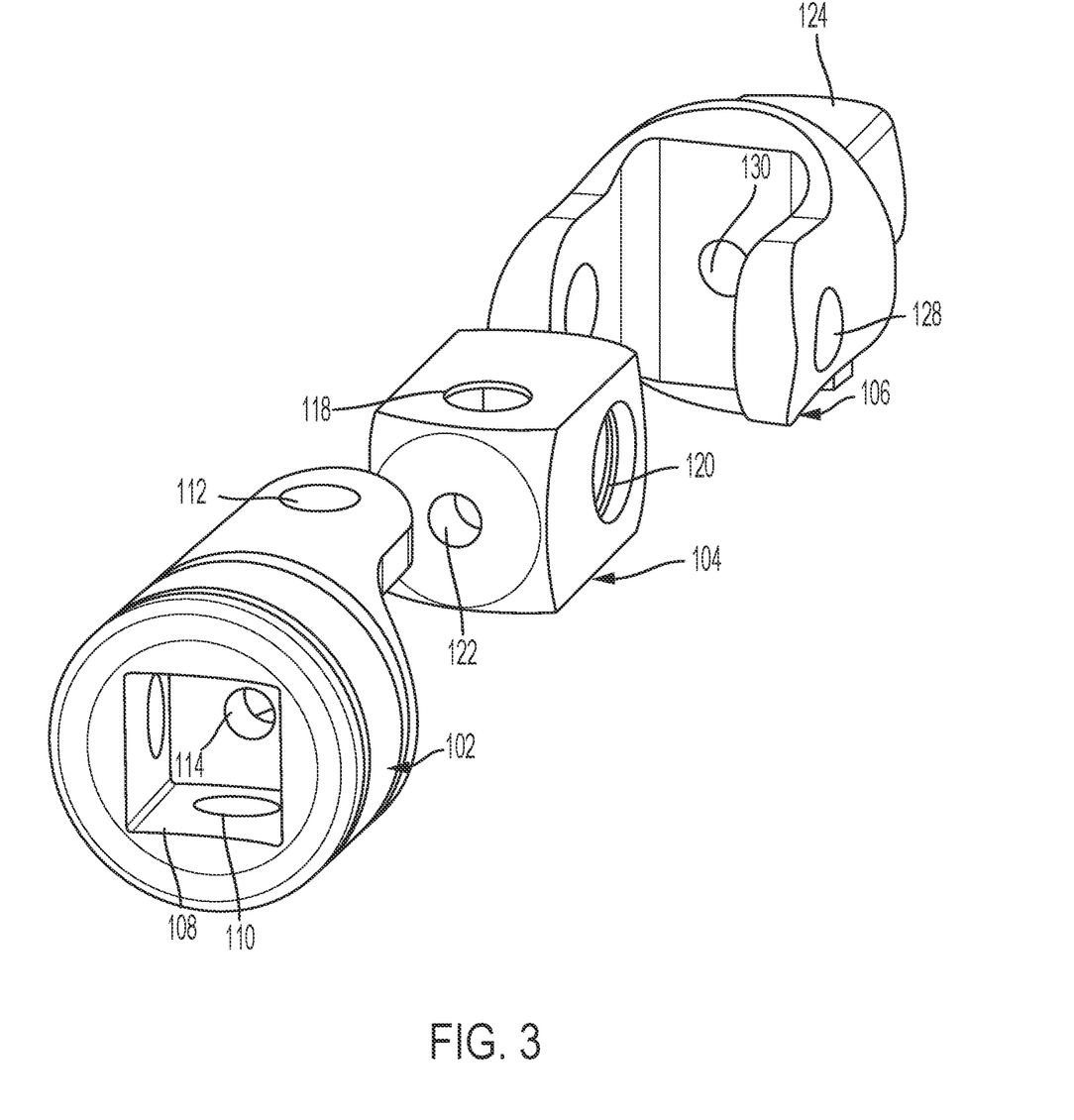
FIG. 3 is a perspective, disassembled view of a drive body, center body, and work body of the tool adapter assembly of FIG. 1.

Referring to FIGS. 1-3, a tool adapter assembly 100, such as, for example, a socket or socket adapter, having a drive body 102, a center body 104, and a work body 106 is shown. The drive body 102 is rotatably or pivotably coupled to the center body 104 and the work body is rotatably or pivotably coupled to the center body, using fasteners (not shown for clarity), such as, for example, screws, rivets, welded pins, etc. Accordingly, the drive body 102 and the work body 106 can be adjusted in a number of positions/angles relative to one another by a user.

The drive body 102 includes a female aperture 108, for example, a square shaped bore, that is adapted to be releasably mated with a square male lug of a torque application tool, for example a ratchet or torque application wrench or breaker bar. The female aperture 108 can further include an indent 110 disposed on one or more inner surfaces thereof that is adapted to engage an outwardly biased ball disposed on the male lug of the tool. However, the invention is not limited as such and other means of releasably mating the drive body 102 to the lug of the tool can be used, such as, for example, a snap-ring, friction fit, etc. can be used. The drive body 102 further includes one or more drive body apertures 112 adapted to receive a fastener to rotatably couple the drive body 102 to the center body 104. The drive body also further includes a drive body axial bore 114 adapted to receive a stiffening member 116, which is described in more detail below.

The center body 104 includes first 118 and second 120 center body apertures adapted to receive the fasteners and a center body axial bore 122 adapted to receive the stiffening member 116. In an embodiment, the first 118 and second 120 center body apertures may be offset or angularly disposed by about 90 degrees with respect to each other. The drive body apertures 112 of the drive body 102 are aligned with opposing ends of the first aperture 118, and a fastener is disposed in the drive body apertures 112 and first aperture 118 to couple the drive body 102 and the center body 104 together. This allows the drive body 102 to rotate or pivot about or around a first axis extending through the drive body apertures 112 and first aperture 118.

The work body 106 is adapted to engage a working piece, for example, a socket or fastener. In an embodiment, the tool assembly 100 is a socket adapter. Accordingly, the work body 106 includes a work body lug 124 and an outwardly biased ball 126 disposed on the work body lug 124 to releasably mate with, for example, a socket. However, the invention is not limited as such and other means of releasably mating to the work piece, such as, for example, a friction ring, can be used. In this example, the work body lug 124 is square, although the invention is not limited as such. In another embodiment (not shown), the tool assembly 100 is a socket. In this embodiment, the work body 106 includes a female aperture adapted to engage a head of a fastener, for example a bolt.

The work body 106 includes one or more work body apertures 128 adapted to receive the fastener to rotatably couple the work body 106 to the center body 104. For example, the work body apertures 128 are aligned with opposing ends of the second aperture 120, and a fastener is disposed in the work body apertures 128 and second aperture 120 to couple the work body 106 and the center body 104 together. This allows the work body 106 to rotate or pivot about or around a second axis extending through the work body apertures 128 and second aperture 120. As illustrated, the first axis extending through the drive body apertures 112 and first aperture 118, and second axis extending through the work body apertures 128 and second aperture 120 are perpendicular to each other or angularly disposed by about 90 degrees with respect to one another. The work body 106 also further includes a work body axial bore 130 adapted to receive the stiffening member 116.

The stiffening member 116 is disposed in the drive body axial bore 114, the center body axial bore 122, and the work body axial bore 130, thereby allowing the stiffening member 116 to be inserted and extend through all three bodies. The stiffening member 116 is adapted to retain a shape set by a user. For example, the user can rotate or pivot the drive body 102 with respect to the center body 104 to a first desired angular portion, and the stiffening member 116 retains the drive body 102 in that first desired position. Similarly, the user can rotate or pivot the work body 106 with respect to the center body 104 to a second desired angular portion, and the stiffening member 116 retains the work body 106 in that second desired position. The stiffening member 116 also restricts movement of the drive body 102 and work body 106 from the desired positions set by the user. This stiffening member 116 can be made of any material that sufficiently adds stiffness and flexibility to allow the drive body 102 and the work body 106 to be rotated or pivoted to desired positions and retain the desired positions and/or restrict movement from the desired position/angle set by the user. The stiffening member 116 can be, for example, a tension rod. Accordingly, tension rods having varying stiffness may be used or be replaceable to allow adjustability of the stiffness. In another example, the stiffening member 116 may be in the form of an adjustable tension rod with adjustable spring tension to allow for adjustability of the stiffness.

Figure 4:
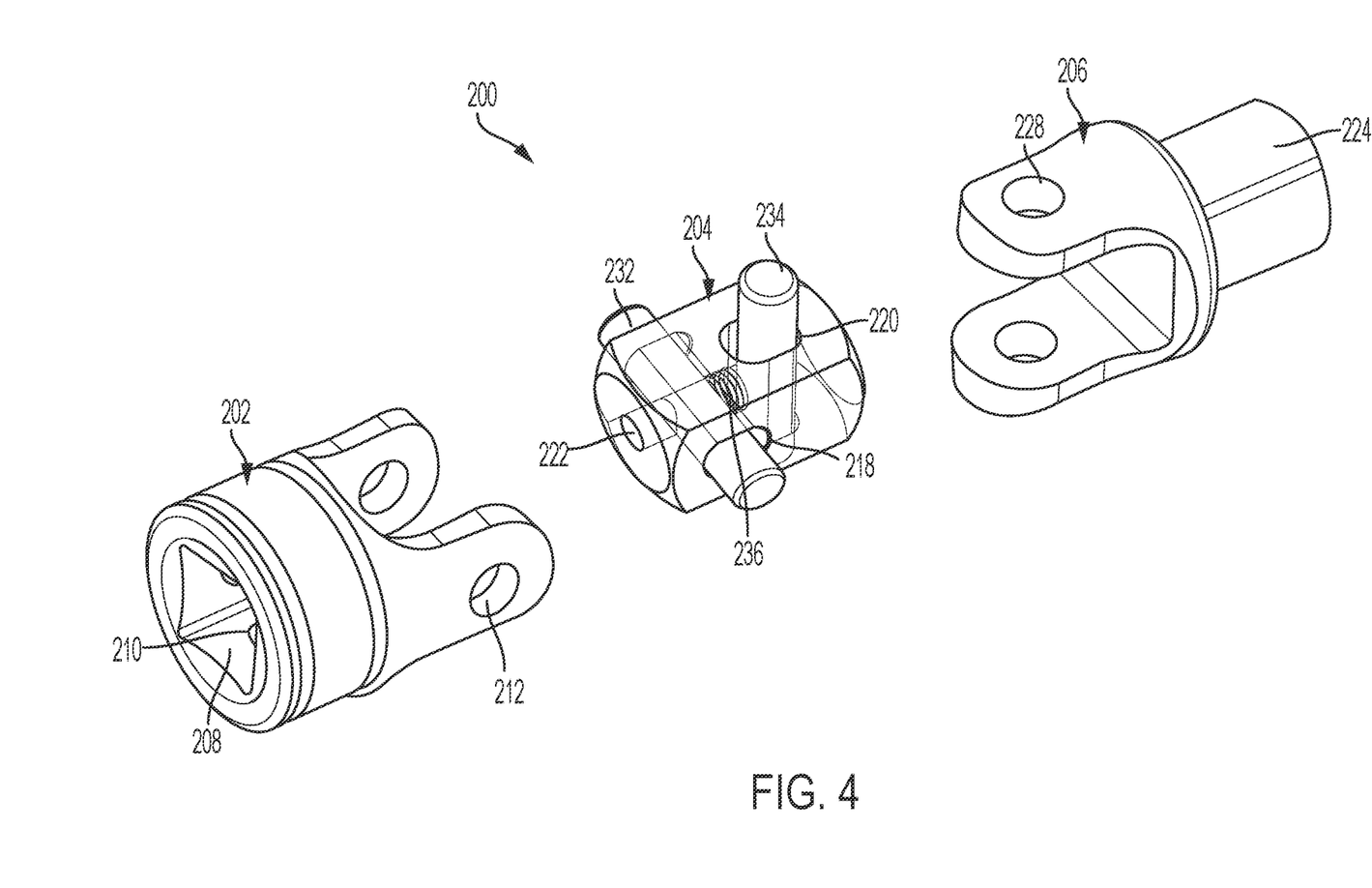
FIG. 4 is a perspective, disassembled view of a tool adapter assembly, according to another embodiment of the present invention.
Figure 5:
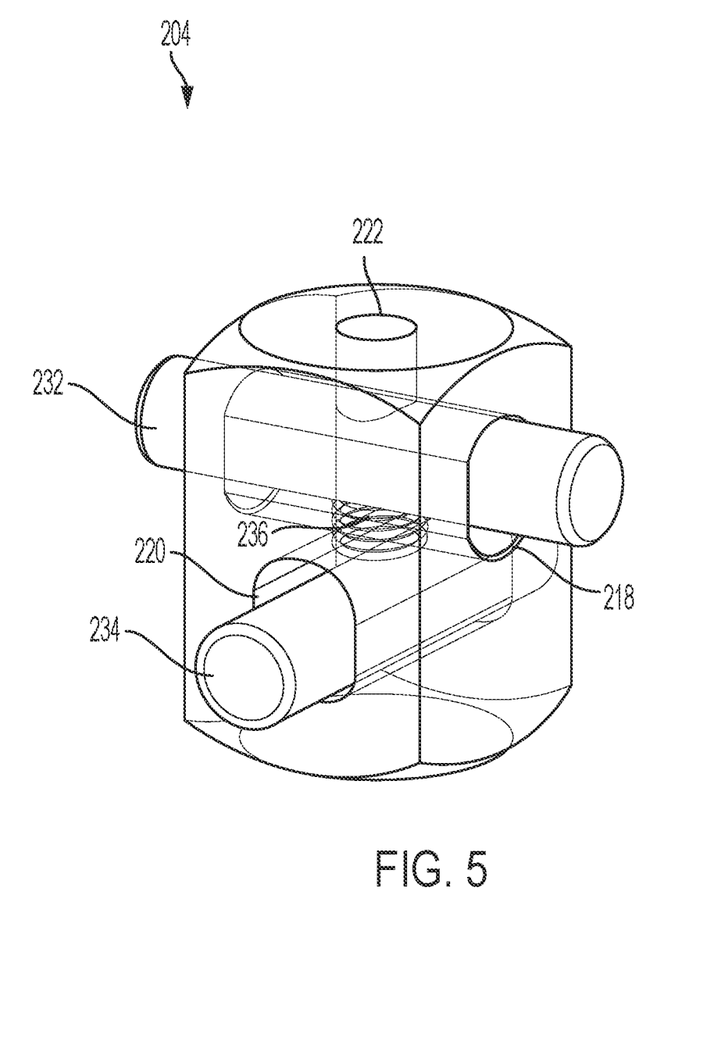
FIG. 5 is a perspective view of a body portion of the tool adapter assembly of FIG. 4.

In another embodiment, as shown in FIGS. 4 and 5, a tool adapter assembly 200, such as, for example, a socket or socket adapter, having a drive body 202, a center body 204, and a work body 206 (which are substantially similar to the drive body 102, the center body 104, and the work body 106 described above) Similar to the tool adapter assembly 100 described above, the drive body 202 is rotatably or pivotably coupled to the center body 204 via a first fastener 232, and the work body 206 is rotatably or pivotably coupled to the center body 204, using a second fastener 234. The first 232 and second 234 fasteners can be, for example, screws, rivets, welded pins, etc. Accordingly, the drive body 202 and the work body 206 can be adjusted in a number of positions/angles relative to one another by a user.

Similar to the drive body 102 described above, the drive body 202 includes a female aperture 208, for example, a square shaped bore, that is adapted to be releasably mated with a square male lug of a torque application tool, for example a ratchet or torque wrench or a breaker bar. The female aperture 208 can further include an indent 210 disposed on one or more inner surfaces thereof that is adapted to detainably engage an outwardly biased ball disposed on the male lug of the tool. However, the invention is not limited as such and other means of releasably mating the drive body 202 to the lug of the tool can be used, such as, for example, a snap-ring, friction fit, etc. can be used Similar to the drive body 102 described above, the drive body 202 further includes one or more drive body apertures 212 adapted to receive the first fastener 232 to rotatably couple the drive body 202 to the center body 204.

Similar to the center body 104 described above, the center body 204 includes first 218 and second 220 center body apertures adapted to respectively receive the first 232 and second 234 fasteners, and a center body axial bore 222 adapted to receive, for installation, a biasing member 236, which will be described in more detail below. In this embodiment, the first 218 and second 220 center body apertures are slotted (as illustrated) or otherwise slightly larger in diameter than the first 232 and second 234 fasteners. The first 218 and second 220 center body apertures may also be offset or angularly disposed by about 90 degrees with respect to each other. The drive body apertures 212 of the drive body 202 are aligned with opposing ends of the first aperture 218, and the first fastener 232 is disposed in the drive body apertures 212 and first aperture 218 to couple the drive body 202 and the center body 204 together. This allows the drive body 202 to rotate or pivot about or around a first axis extending through the drive body apertures 212 and first aperture 218.

Similar to the work body 106 described above, the work body 206 is adapted to engage a working piece, for example, a socket or fastener. In an embodiment, the tool assembly 200 is a socket adapter Similar to the work body 106 described above, the work body 206 includes a work body lug 224 and an outwardly biased ball disposed on the work body lug 224 to releasably mate with, for example, a socket. However, the invention is not limited as such and other means of releasably mating to the work piece, such as, for example, a friction ring can be used. In this example, the work body lug 224 is square, although the invention is not limited as such. In an alternative embodiment (not shown), the tool assembly 200 is a socket. In this embodiment, the work body 206 includes a female aperture adapted to engage a head of a fastener, for example a bolt.

Similar to the work body 106 described above, the work body 206 includes one or more work body apertures 228 adapted to receive the second fastener 234 to rotatably couple the work body 206 to the center body 204. For example, the work body apertures 228 are aligned with opposing ends of the second aperture 220, and the second fastener 234 is disposed in the work body apertures 228 and second aperture 220 to couple the work body 206 and the center body 204 together. This allows the work body 206 to rotate or pivot about or around a second axis extending through the work body apertures 228 and second aperture 220. As illustrated, the first axis extending through the drive body apertures 212 and first aperture 218, and second axis extending through the work body apertures 228 and second aperture 220 are perpendicular to each other or angularly disposed by about 90 degrees with respect to one another.

The biasing member 236 is disposed in the center body 204 between the first 232 and second 234 fasteners, thereby causing the biasing member 236 to apply a biasing force to the first 232 and second 234 fasteners to push the first 232 and second 234 fasteners away from one another. The biasing member 236 biases the first fastener 232 to abut the first center body aperture 218 and biases the second fastener 234 to abut the second center body aperture 220, thereby increasing friction between the first fastener 232 and the first center body aperture 218 and between the second fastener 234 and the second center body aperture 220. The increased friction assists in retaining a position/angle of the drive body 202 and work body 206 set by a user. For example, the user can rotate or pivot the drive body 202 with respect to the center body 204 to a first desired angular portion, and the biasing member 236 and increased friction retains the drive body 202 in that first desired position Similarly, the user can rotate or pivot the work body 206 with respect to the center body 204 to a second desired angular portion, and the biasing member 236 and increased friction retains the work body 206 in that second desired position. The biasing member 236 and increased friction also restricts movement of the drive body 202 and work body 206 from the desired positions set by the user.

In an embodiment, the biasing member 236 can be a coil spring(s), wave spring(s), Bellville washer(s), rubber, or other suitable compressible or elastomeric material for applying the biasing force. The biasing member 236 can be installed in the center body 204 by being inserted thereto via the center body axial bore 222.

Figure 6:
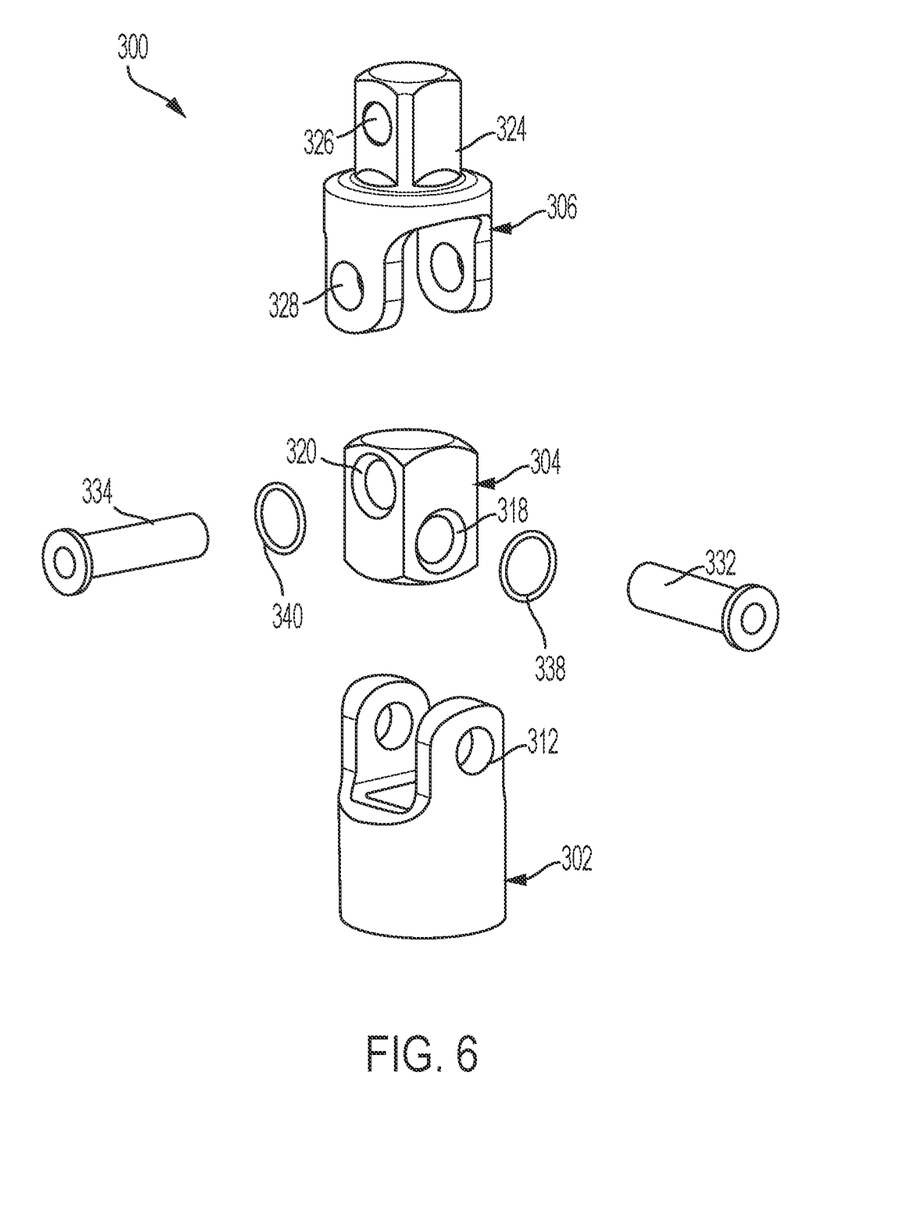
FIG. 6 is a perspective, disassembled view of a tool adapter assembly, according to another embodiment of the present invention.

In another embodiment, as shown in FIG. 6, a tool adapter assembly 300, such as, for example, a socket or socket adapter, having a drive body 302, a center body 304, and a work body 306 (which are substantially similar to the drive body 102, the center body 104, and the work body 106 described above) Similar to the tool adapter assembly 100 described above, the drive body 302 is rotatably or pivotably coupled to the center body 304 via a first fastener 332, and the work body 306 is rotatably or pivotably coupled to the center body 304, using a second fastener 334. The first 332 and second 334 fasteners can be, for example, screws, rivets, welded pins, etc. Accordingly, the drive body 302 and the work body 306 can be adjusted in a number of positions/angles relative to one another by the user.

Similar to the drive body 102 described above, the drive body 302 can include a female aperture that is substantially similar to the female aperture 108. Similar to the drive body 102 described above, the drive body 302 further includes one or more drive body apertures 312 adapted to receive the first fastener 332 to rotatably couple the drive body 302 to the center body 304.

Similar to the center body 104 described above, the center body 304 includes first 318 and second 320 center body apertures adapted to respectively receive to the first 332 and second 334 fasteners. In an embodiment, each of the first 318 and second 320 center body apertures are chamfered to respectively receive first 338 and second 340 rings, which will be discussed in more detail below.

In an embodiment, the first 318 and second 320 center body apertures may be offset or angularly disposed by about 90 degrees with respect to each other. The drive body apertures 312 of the drive body 302 are aligned with opposing ends of the first aperture 318, and the first fastener 332 is disposed in the drive body apertures 312 and first aperture 318 to couple the drive body 302 and the center body 304 together. This allows the drive body 302 to rotate or pivot about or around a first axis extending through the drive body apertures 312 and first aperture 318.

Similar to the work body 106 described above, the work body 306 is adapted to engage a working piece, for example, a socket or fastener. In an embodiment, the tool assembly 300 is a socket adapter Similar to the work body 106 described above, the work body 306 includes a work body lug 324 and an outwardly biased ball 326 disposed on the work body lug 324 to releasably mate with, for example, a socket. However, the invention is not limited as such and other means of releasably mating to the work piece, such as, for example, a friction ring, can be used. In this example, the work body lug 324 is square, although the invention is not limited as such. In an alternative embodiment (not shown), the tool assembly 300 is a socket. In an embodiment, the work body 306 includes a female aperture adapted to engage a head of a fastener, for example a bolt.

Similar to the work body 106 described above, the work body 306 includes one or more work body apertures 328 adapted to receive the second fastener 334 to rotatably couple the work body 306 to the center body 304. For example, the work body apertures 328 are aligned with opposing ends of the second aperture 320, and the second fastener 334 is disposed in the work body apertures 328 and second aperture 320 to couple the work body 306 and the center body 304 together. This allows the work body 306 to rotate or pivot about or around a second axis extending through the work body apertures 328 and second aperture 320. As illustrated, the first axis extending through the drive body apertures 312 and first aperture 318, and second axis extending through the work body apertures 328 and second aperture 320 are perpendicular to each other or angularly disposed by about 90 degrees with respect to one another.

The first ring 338 is disposed between the drive body 302 and the center body 304, with the first fastener 332 extending through the first ring 338. The second ring 340 is disposed between the work body 306 and the center body 304, with the second fastener 334 extending through the second ring 340. The first and second rings 338/340 respectively apply a compressive force and increase friction between the drive body 302 and the center body 304, and between the work body 306 and the center body 304. The compressive force and increased friction assists in retaining a shape set by a user. For example, the user can rotate or pivot the drive body 302 with respect to the center body 304 to a first desired angular portion, and the compressive force and increased friction caused by the first ring 338 retains the drive body 302 in that first desired position. Similarly, the user can rotate or pivot the work body 306 with respect to the center body 304 to a second desired angular portion, and the compressive force and increased friction caused by the second ring 340 retains the work body 306 in that second desired position. The compressive force and increased friction caused by the first and second rings 338/340 also restricts movement of the drive body 302 and work body 306 from the desired positions set by the user.

The first 338 and second 340 rings can be made from an elastomer, for example rubber, or other suitable compressible or compressible material. If the first 332 and second 334 fasteners are threaded fasteners, for example screws, the first 338 and second 340 rings can be replaced should the rubber rings begin to wear or age. Accordingly, the entire assembly 300 will not need to be replaced. Additionally, the amount of compressive force and friction can be adjusted for optimal retention and joint stiffness by changing, for example, ring thickness, rubber durometer/stiffness, the elastomer compound, etc.

Figure 7:
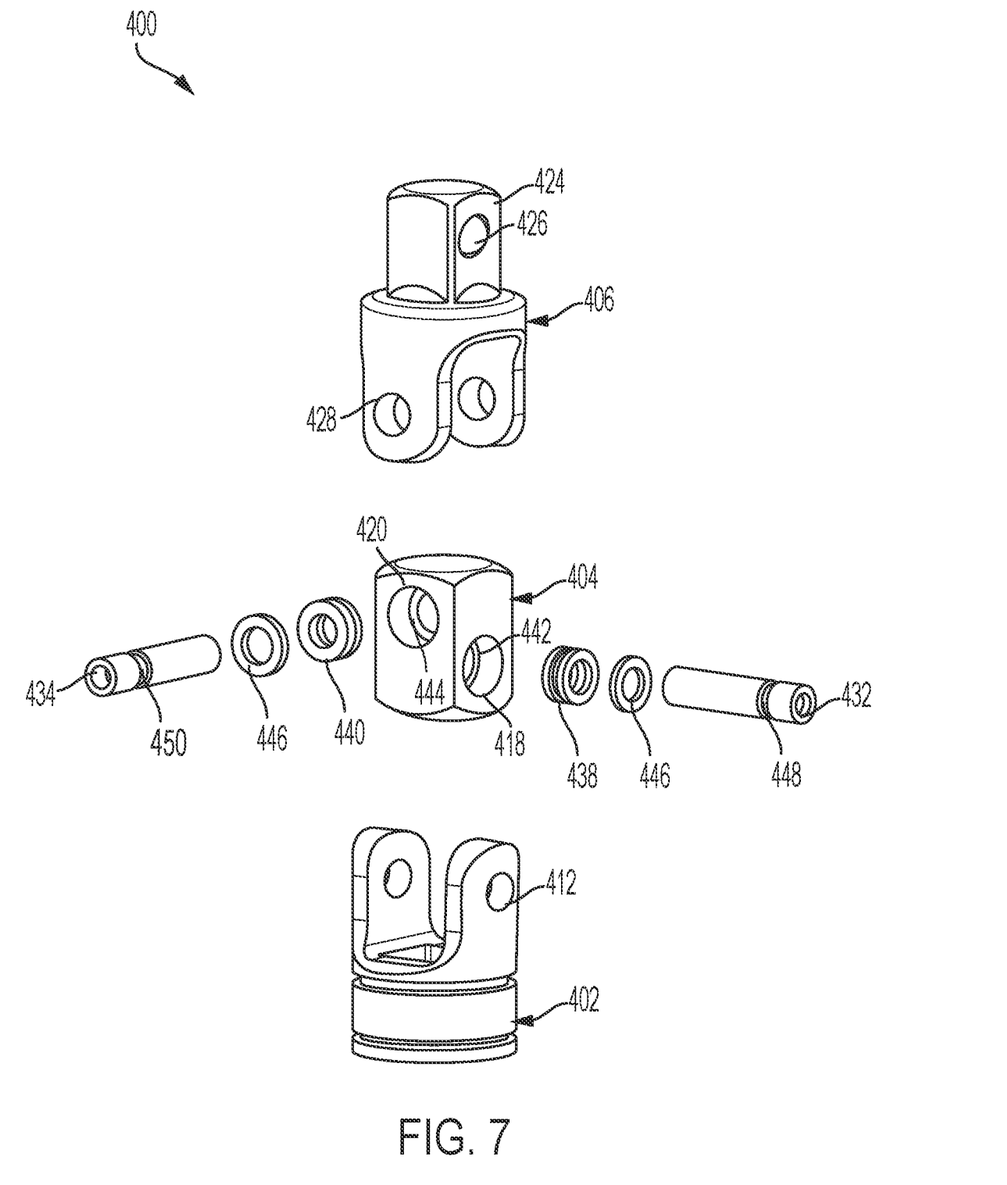
FIG. 7 is a perspective, disassembled view of a tool adapter assembly, according to another embodiment of the present invention.
Figure 8:
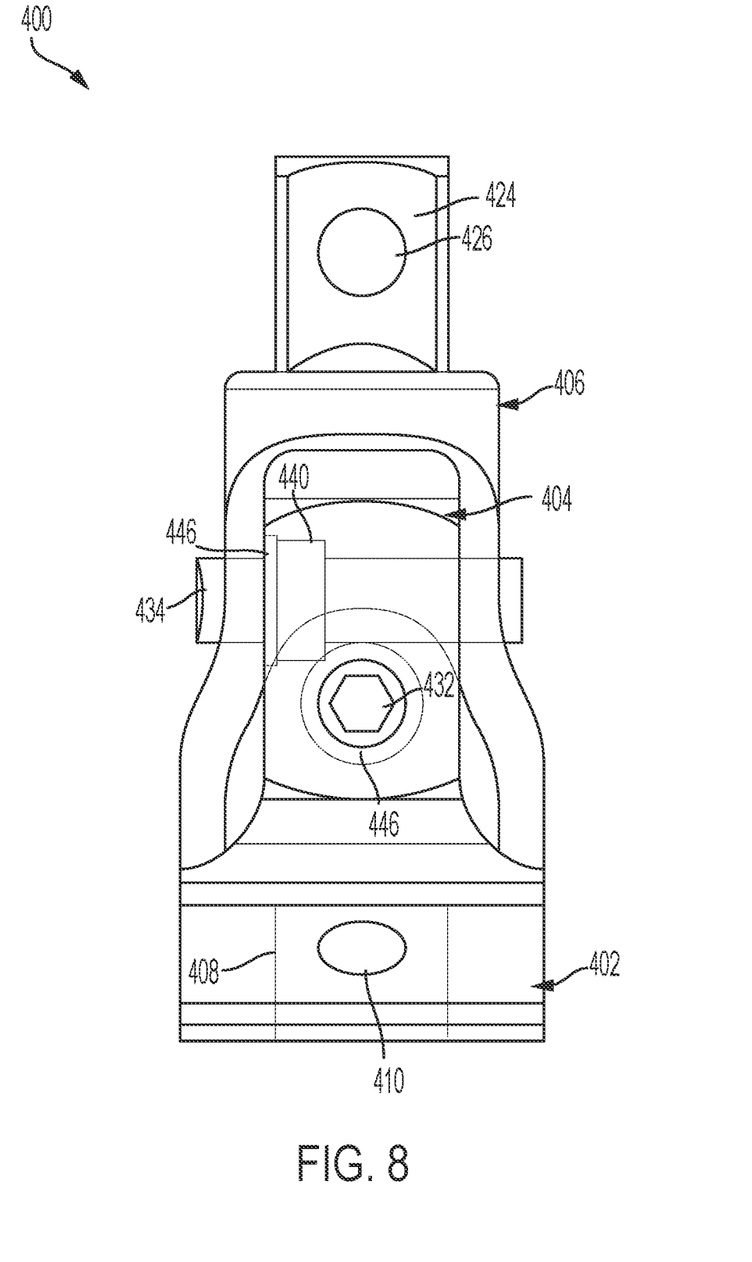
FIG. 8 is a side, assembled view of the tool adapter assembly of FIG. 7.

In another embodiment, as shown in FIGS. 7 and 8, a tool adapter assembly 400, such as, for example, a socket or socket adapter, having a drive body 402, a center body 404, and a work body 406 (which are substantially similar to the drive body 302, the center body 304, and the work body 306 described above) Similar to the tool adapter assembly 300 described above, the drive body 402 is rotatably or pivotably coupled to the center body 404 via a first fastener 432, and the work body 406 is rotatably or pivotably coupled to the center body 404, using a second fastener 434. The first 432 and second 434 fasteners are threaded fasteners, for example, screws. Accordingly, the drive body 402 and the work body 406 can be adjusted in a number of positions/angles relative to one another by the user.

Similar to the drive body 102 described above, the drive body 402 can include a female aperture 408, which is substantially similar to the female aperture 108, and can be for example, a square shaped bore, that is adapted to be releasably mated with a square male lug of a torque application tool, for example, a ratchet or torque wrench or breaker bar. Similar to the female aperture 108 described above, the female aperture 408 can further include an indent 410 disposed on one or more inner surfaces thereof that is adapted to detainably engage an outwardly biased ball disposed on the male lug of the tool. However, the invention is not limited as such and other means of releasably mating the drive body 402 to the lug of the tool can be used, such as, for example, a snap-ring, friction fit, etc. can be used. Similar to the drive body 102 described above, the drive body 302 further includes one or more drive body apertures 412 adapted to receive the first fastener 432 to rotatably couple the drive body 402 to the center body 404. In this embodiment, one of the drive body apertures 412 is threaded and adapted to threadably couple to the first fastener 432.

Similar to the center body 304 described above, the center body 404 includes first 418 and second 420 center body apertures adapted to respectively receive to the first 432 and second 434 fasteners. In this embodiment, a first shoulder 442 extends circumferentially within the first center body aperture 418, and a second shoulder 444 extends circumferentially within the second center body aperture 420. The first 418 and second 420 center body apertures may be offset or angularly disposed by about 90 degrees with respect to each other. The drive body apertures 412 of the drive body 402 are aligned with opposing ends of the first aperture 418, and the first fastener 432 is disposed in the drive body apertures 412 and first aperture 418 to couple the drive body 402 and the center body 404 together. This allows the drive body 402 to rotate or pivot about or around a first axis extending through the drive body apertures 412 and first aperture 418.

Similar to the work body 106 described above, the work body 406 is adapted to engage a working piece, for example, a socket or fastener. In the present embodiment, the tool assembly 400 is a socket adapter Similar to the work body 306 described above, the work body 406 includes a work body lug 424 and an outwardly biased ball 426 disposed on the work body lug 424 to releasably mate with, for example, a socket. However, the invention is not limited as such and other means of releasably mating to the work piece, such as, for example, a friction ring, can be used. In this example, the work body lug 424 is square, although the invention is not limited as such. In an alternative embodiment (not shown), the tool assembly 400 is a socket. In an embodiment, the work body 406 includes a female aperture adapted to engage a head of a fastener, for example a bolt.

Similar to the work body 306 described above, the work body 306 includes one or more work body apertures 428 adapted to receive the second fastener 434 to rotatably couple the work body 406 to the center body 404. In an embodiment, one of the work body apertures 428 is threaded and adapted to threadably couple to the second fastener 434. For example, the work body apertures 428 are aligned with opposing ends of the second aperture 420, and the second fastener 434 is disposed in the work body apertures 428 and second aperture 420 to couple the work body 406 and the center body 404 together. This allows the work body 406 to rotate or pivot about or around a second axis extending through the work body apertures 428 and second aperture 420. As illustrated, the first axis extending through the drive body apertures 412 and first aperture 418, and second axis extending through the work body apertures 428 and second aperture 420 are perpendicular to each other or angularly disposed by about 90 degrees with respect to one another.

In an embodiment, the tool assembly 400 further includes first and second retaining members 446 respectively coupled to a first groove 448 disposed on the first fastener 432 and a second groove 450 disposed on the second fastener 434. In an embodiment, the retaining members 446 are retaining rings.

A first ring 438 is disposed within the first center body aperture 418 between the first retaining member 446 and the first shoulder 442, with the first fastener 432 extending through the first retaining member 446 and the first ring 438. A second ring 440 is disposed within the second center body aperture 420 between the second retaining member 446 and the second shoulder 444, with the second fastener 434 extending through the second retaining member 446 and the second ring 440 Similar to the first 338 and second 340 rings described above, the first 438 and second 440 rings can be made from an elastomer, for example rubber, or other suitable compressible or elastomeric material. As the first fastener 432 is rotated in a clockwise or counterclockwise direction, an axial distance between the first retaining ring 446 and the first shoulder 442 is decreased, thereby applying a compressive force to the first ring 438 in an axial direction, which causes the first ring 438 to expand in a radial direction to increase friction between the first ring 438 and the center body 404 Similarly, as the second fastener 434 is rotated in a clockwise or counterclockwise direction, an axial distance between the second retaining ring 446 and the second shoulder 444 is decreased, thereby applying a compressive force to the second ring 440 in an axial direction, which causes the second ring 440 to expand in a radial direction to increase friction between the second ring 440 and the center body 404. Accordingly, the amount of compressive force and friction can be adjusted without disassembly of the tool adapter assembly 400 for optimal retention and joint stiffness by rotation of the first 432 and second 434 fasteners.

The compressive force and increased friction assists in retaining a shape set by a user. For example, the user can rotate or pivot the drive body 402 with respect to the center body 404 to a first desired angular portion, and the compressive force and increased friction caused by the first fastener 432, first retaining ring 446, first ring 438, and the first shoulder 442 retains the drive body 402 in that first desired position Similarly, the user can rotate or pivot the work body 406 with respect to the center body 404 to a second desired angular portion, and the compressive force and increased friction caused by the second fastener 434, second retaining ring 446, second ring 440, and the second shoulder 444 retains the work body 406 in that second desired position. The compressive force and increased friction also restricts movement of the drive body 402 and work body 406 from the desired positions set by the user.

The ability of the tool adapter assemblies 100, 200, 300, and 400 described herein to maintain angular position of the drive and work bodies with respect to the center body, allows the user to manipulate the positions to a desired position, and then "fish" the tool adapter assembly to a work piece, without the tool adapter assembly losing the desired shape.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool adapter assembly for a tool having a tool lug and adapted to engage a work piece, the tool adapter assembly comprising:
   a center body including an exterior surface having first and second center body apertures that are angularly offset by about 90 degrees relative to each other, wherein the first and second center body apertures are adapted to respectively receive first and second fasteners;
   a drive body rotatably coupled to the center body and adapted to engage the tool lug, wherein the drive body is rotatable relative to the center body to a first angular position;
   a work body rotatably coupled to the center body and adapted to engage the work piece, wherein the work body is rotatable relative to the center body to a second angular position; and
   a stiffening member disposed within the center, drive, and work bodies, wherein the stiffening member is adapted to selectively retain a shape holding the drive and work bodies respectively in the first and second angular positions, and the first and second angular positions are non-zero angles.

2. The tool adapter assembly of claim 1, wherein each of the center, drive, and work bodies includes an axial bore that is adapted to receive the stiffening member.

3. The tool adapter assembly of claim 1, wherein the drive body includes a female aperture that is adapted to releasably mate with the tool lug.

4. The tool adapter assembly of claim 3, wherein the female aperture includes an indent disposed on an inner surface thereof, and the indent is adapted to detainably engage an outwardly biased ball disposed on the tool lug.

5. The tool adapter assembly of claim 1, wherein the work body includes a work body lug that is adapted to releasably mate with the work piece.

6. The tool adapter assembly of claim 1, wherein the stiffening member is a tension rod.

7. The tool adapter assembly of claim 6, wherein a stiffness of the tension rod is adjustable.

8. The tool adapter assembly of claim 1, wherein the drive body is rotatably coupled to the center body by the first fastener.

9. The tool adapter assembly of claim 1, wherein the work body is rotatably coupled to the center body by the second fastener.

10. A tool adapter assembly for a tool having a tool lug, the tool adapter assembly comprising:
   a center body;
   a drive body rotatably coupled to the center body and adapted to engage the tool lug, wherein the drive body is rotatable relative to the center body to a first angular position;
   a work body rotatably coupled to the center body and adapted to engage a work piece, wherein the work body is rotatable relative to the center body to a second angular position; and
   a tension rod having a stiffness is disposed within the center, drive, and work bodies, wherein the tension rod is adapted to selectively retain a shape holding the drive and work bodies respectively in the first and second angular positions, wherein the first and second angular positions are non-zero angles, and the stiffness is adjustable.

\* \* \* \* \*